United States Patent
Wu et al.

(10) Patent No.: US 9,363,372 B2
(45) Date of Patent: Jun. 7, 2016

(54) METHOD FOR PERSONALIZING VOICE ASSISTANT

(71) Applicant: RICHPLAY INFORMATION CO., LTD., New Taipei (TW)

(72) Inventors: Jun-Hui Wu, New Taipei (TW); Yan-Jiun Lin, Miaoli County (TW)

(73) Assignee: Richplay Information Co., Ltd., New Taipei (TW)

( * ) Notice: Subject to any disclaimer, the term of this patent is extended or adjusted under 35 U.S.C. 154(b) by 45 days.

(21) Appl. No.: 14/320,743

(22) Filed: Jul. 1, 2014

(65) Prior Publication Data
US 2015/0023481 A1 Jan. 22, 2015

(30) Foreign Application Priority Data
Jul. 19, 2013 (TW) .............................. 102125883 A

(51) Int. Cl.
*H04M 1/64* (2006.01)
*H04M 3/493* (2006.01)

(52) U.S. Cl.
CPC .................................. *H04M 3/4936* (2013.01)

(58) Field of Classification Search
CPC .................... H04M 3/4936; H04M 2201/40
USPC ........................................... 379/88.01–88.02
See application file for complete search history.

(56) References Cited

U.S. PATENT DOCUMENTS

| 2013/0246051 A1* | 9/2013 | Cai ......................... G10L 17/00 704/201 |
| 2014/0214417 A1* | 7/2014 | Wang ...................... G10L 17/18 704/232 |

FOREIGN PATENT DOCUMENTS

JP 2003131695 A * 5/2003

OTHER PUBLICATIONS

"iPhone Siri Like App for Android Phones", Kashish Bidsar, Nov. 23, 2011, http://appstouse.com/iphone-siri-like-app-for-android-phones/2387, pp. 1-9.*
"iPhone Siri App for Android Phones", Kashish Bidsar, Nov. 23, 2011, http://appstouse.com/iphone-siri-like-app-for-android-phones/2387, pp. 1-9.*

* cited by examiner

*Primary Examiner* — Van D Huynh
(74) *Attorney, Agent, or Firm* — Rosenberg, Klein & Lee

(57) ABSTRACT

The present invention provides a method for personalizing voice assistant. First, the voice module is activated. Then, the voice message received by the voice module is recognized. According to the recognition result, the personal name in the voice message is converted to the intelligent conversation name at a remote site, and thus triggering an intelligent conversation module of the server for providing the service of intelligent conversation. Accordingly, the present invention corresponds the universal intelligent conversation name to the personal name for triggering the intelligent conversation module. Consequently, the voice assistant can be personalized.

8 Claims, 5 Drawing Sheets

METHOD FOR PERSONALIZING VOICE ASSISTANT

FIELD OF THE INVENTION

The present invention relates generally to a method for building a system configure, and particularly to a method for a personalizing voice assistant.

BACKGROUND OF THE INVENTION

With the coming of digital age, the interaction between humans and electronic products becomes increasingly frequent. Nonetheless, the current operational interfaces of electronic products cannot satisfy users' needs gradually. The most natural way of communication in people's daily lives is language. Hence, if communication with electronic products can be done by using language directly, users will accept the operational interfaces of electronic products more easily. For example, by adding a voice recognition device into an electronic product, human languages can be converted to a series of commands for operating the electronic product. As a consequence, the operations of the electronic product will be more convenient and the added value of the electronic product will be increased substantially.

In additions, in recent years, the main driving force of growth for the global mobile phone industry comes from two sources. One is the widespread popularity of high-end smartphones in the mature markets such as North America and Europe. The consumers' substantial purchasing power boosts delivery of mobile phones. The other source is the rapidly increasing demand of mid- and low-end smartphones in new markets such as South America and Asia. Moreover, in China and India, the infrastructure in upgrading from the 2G to the 3G, leads to enormous demands in purchasing new phones. Therefore, the quantity of manufactured smartphones worldwide was approximately 1.67 billion in 2011 and 1.79 billion in 2012. In the end of 2012, the number of global users of smartphones had reached as many as 1.1 billion. By taking tablet computers into account, till the second quarter of 2013, the total quantity of smartphones and tablet computers worldwide had exceeded that of traditional desktop and notebook computers. Apparently, a brand new battlefield of hardware and software has already emerged.

Portable electronic devices have been adopted extensively and provide various functions. Smartphones and tablet computers emphasize handheld application and portability; they also provide web browsers, multimedia playing, digital image extraction, and application programs (APP). In particular, application programs drive smartphones to another apex in the mobile industry. Famous community websites, for example, facebook and google+, promote the APPs of mobile platforms such as smartphones and make them popular in the world. Owing to the limited input interface of smartphones, the function of voice input is developed. Following the evolution of application programs, the function of voice assistance is developed accordingly.

Nonetheless, the technologies described above do not provide a way to personalize application programs. When people all install the same application program, the situation of repeated program names occurs. While the voice is commanding the application program, those application programs are all activated due to having the same name in adjacent multiple smartphones. For example, the application program of voice assistant in the smartphone iPhone and the tablet computer iPad of APPLE Inc. is named Siri. When iPhones or iPads of APPLE Inc. are placed nearby, due to their identical name of application program, the voice assistants Siri will all be activated by one user's voice command.

In order to solve the problem described above, the present invention provides a method for personalizing voice assistant by providing a personalized name corresponding to the system name. Thereby, even though the same application program is installed in the smartphones of different users, simultaneous activation can be avoided because of their distinct names.

SUMMARY

An objective of the present invention is to provide a method for personalizing voice assistant, which assigns a personal name which the voice assistant correspond. Hence, the application programs in the smartphones will not be interfered by other users.

For achieving the objective described above, the present invention discloses a method for personalizing voice assistant. First, activate a voice module, which has a personal name. Then, input a voice message containing the personal name to the voice module. Next, recognize the voice message for generating recognition data. Afterwards, the voice module converts the personal name of the recognition data to a corresponding intelligent conversation name at a remote site. The intelligent conversation name triggers an intelligent conversation module of the server. Accordingly, personalization of voice assistant is provided for avoiding triggering and activation of multiple voice assistants having the same name by the same voice message.

DETAILED DESCRIPTION

In order to make the structure, characteristics, and the effectiveness of the present invention to be further understood and recognized, the detailed description of the present invention is provided as following along with embodiments and accompanying figures.

The present invention provides a method for personalizing voice assistant, which provides a personalized name corresponding to the name of intelligent conversation. Accordingly, personalization of voice assistant is provided for avoiding triggering and activation of multiple voice assistants having the same name by the same voice message.

Figure 1:
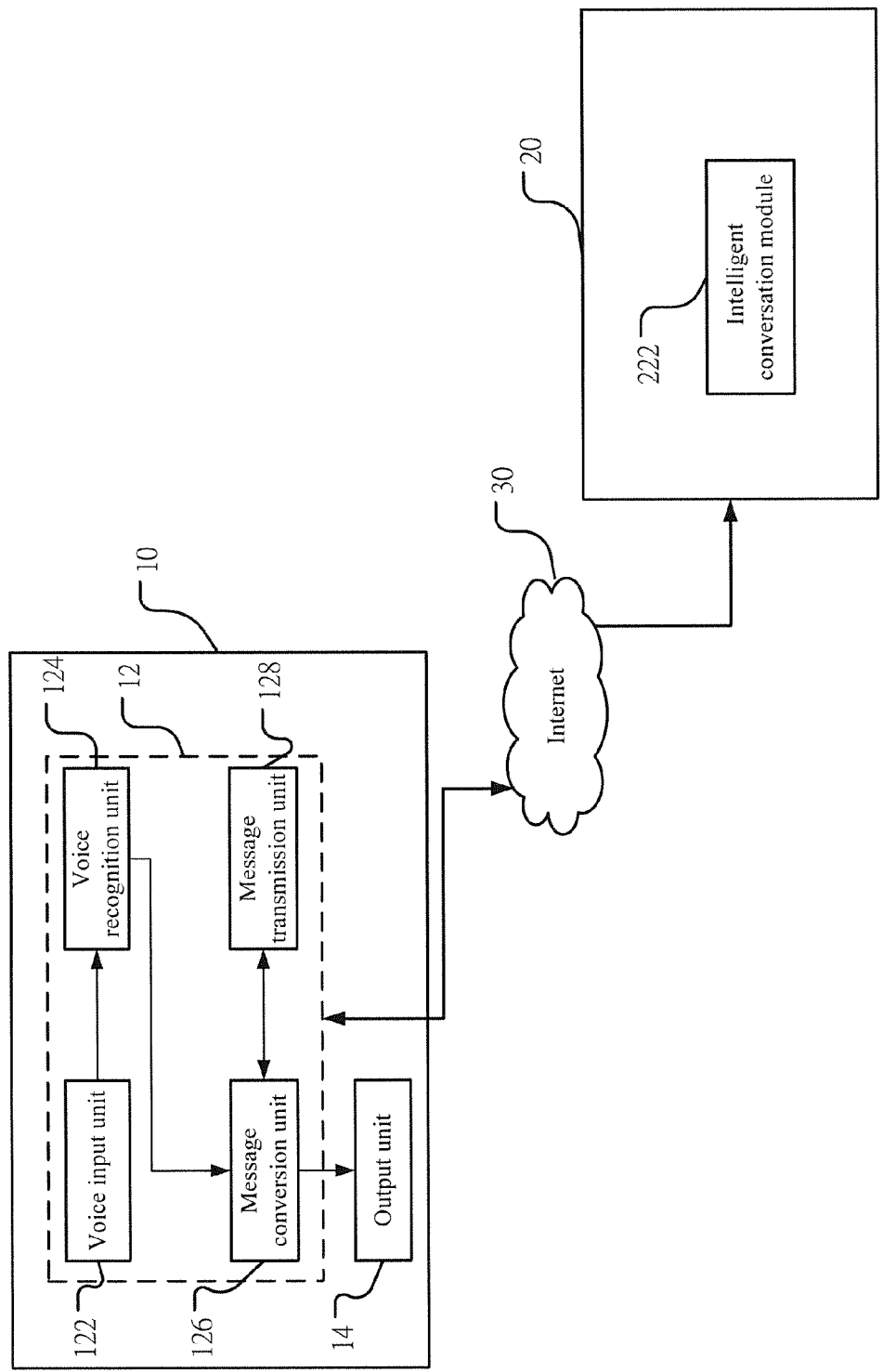
FIG. 1 shows a block diagram according to a preferred embodiment of the present invention.

Please refer to FIG. 1, which shows a block diagram according to a preferred embodiment of the present invention. As shown in the figure, the system of the personalized voice assistant according to the present invention comprises a mobile device 10 and a server 20. The mobile device 10 comprises a voice module 12, which comprises a voice input unit 122, a voice recognition unit 124, a message conversion unit 126, and a message transmission unit 128. The server 20 includes an intelligent conversation module 222. In addition, the mobile device 10 further comprises an output unit 14.

The voice module 12 is disposed in the mobile device 10 and includes a personal name. By using its functions, namely, voice input, voice recognition, message conversion, and message transmission, the voice module 12 executes the corresponding hardware. In the present embodiment, the corresponding units are used for description. The voice input unit 122 corresponds to the microphone (not shown in the figure) and the recording program of the mobile device 10 for recording the voice message input by the user. The voice recognition unit 124 is the operational processing unit of the mobile device 10. It recognizes the received voice message according to the voice recognition algorithm for giving the recognition data. The message conversion unit 126 is also executed in the operational processing unit of the mobile device 10. It provides correlation between the intelligent conversion name and the personal name, so that the personal name of the voice module 12 can correspond to the correlated intelligent conversion name.

The voice transmission unit 128 receives the voice message having the personal name corresponding to the intelligent conversion name, namely, the voice message processed by the voice conversion unit 126, and transmits the voice message to the server 20 via the Internet 30. The server 20 then triggers the corresponding intelligent conversion module 222 of the intelligent conversion name according to the received voice message. If the intelligent conversion module 222 is not activated yet, the server 20 activates the intelligent conversion module 222 according to the received voice message. If the intelligent conversion module 222 is already activated, the server 20 controls the intelligent conversion module 222 according to the received voice message and generates the corresponding replay message. The replay message generated by the intelligent conversion module 222 of the server 20 is transmitted to the voice transmission unit 128 via the Internet 30. The message transmission module 128 transmits the received reply message to the message conversion unit 126 for converting to the corresponding reply message, namely, returning the intelligent conversion name in the reply message to the personal name. Thereby, the voice module 12 can transmit the replay message to the output unit 14 for outputting the reply message, which can be, for example, displaying the reply message corresponding to the personal name on the display unit or playing the reply message corresponding to the personal name by a loudspeaker.

Figure 2:
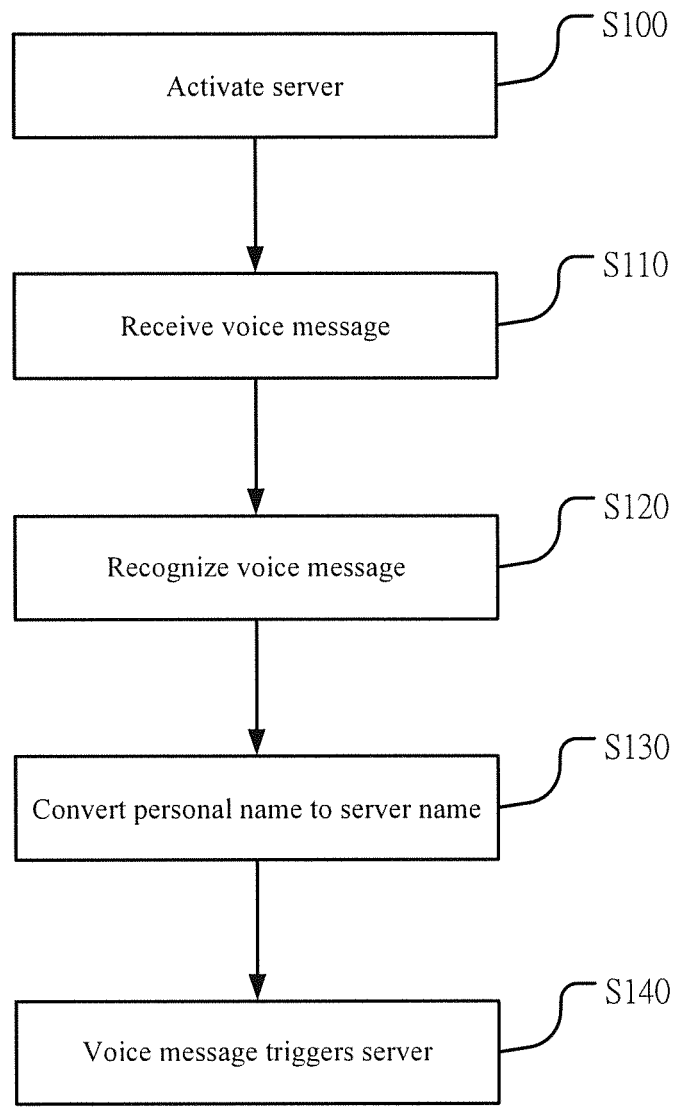
FIG. 2 shows a flowchart according to a preferred embodiment of the present invention.

Please refer to FIG. 1 and FIG. 2, which show a block diagram and a flowchart according to a preferred embodiment of the present invention. As shown in the figures, the present invention provides a personalized solution for solving the problem of simultaneous activation of the voice assistant Siri when the mobile devices are placed nearby. The details are described as follows. The method for personalizing voice assistant comprises steps of:

Step S100: Activating a voice module having a personal name;

Step S110: Inputting a voice message to the voice module, said voice message including said personal name;

Step S120: Recognizing the voice message for producing recognition data;

Step S130: Converting the personal name to an intelligent conversion name; and

Step S140: Triggering an intelligent conversion module of the server.

In the step S100, the user activates the voice module 12 of the mobile device 12. The voice module 12 includes a personal name. The voice module 12 can be different from those in others' mobile devices by means of the personal name. In the step S110, the voice module 12 receives the voice message, for example, "Wake up, Puppy!" input by the user via the voice input unit 122, where "Puppy" is an example of the personal name. In the step S120, the voice module 120, the voice module 12 recognizes the voice message received by the voice input unit 122 using the voice recognition unit 124 and produces the recognition data. The voice recognition unit 124 performs recognition using voice reference data, which include at least a keyword used for referring to and comparing with the text in the voice message. In addition, the voice recognition unit 124 can further perform recognition according to at least an audio frequency, such as 200 Hz to 500 Hz, for reducing the required redundant voice data for recognition.

In the step S130, the message conversion module 126 converts the personal name in the voice message to a corresponding intelligent conversation name at a remote site according to the recognition data. For example, the personal name is Puppy and the intelligent conversation name is Siri. Thereby, the message conversion module 126 corresponds the personal name of the voice message to the intelligent conversation name. In the step S140, the message transmission module 128 transmits the voice message converted by the message conversion module 126 to the server 20 for triggering the intelligent conversation module 222. According to the present embodiment, the intelligent conversation module 222 is triggered by the voice message. Thereby, the user can use the voice module 12 of the mobile device 10 and the intelligent conversation module 222 of the server 20 for having conversation with the voice assistant program.

In the following, an example is provided by referring to FIGS. 1 and 2. The present invention is applied in the situation when the voice assistants Siri in mobile device placed nearby are activated simultaneously.

Figure 3A:
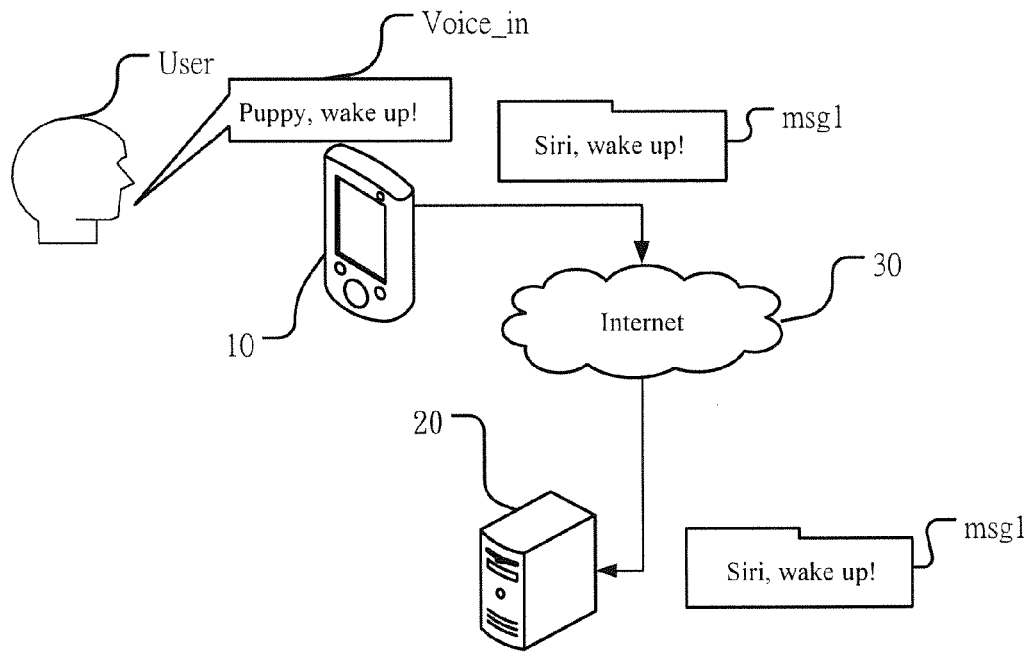
FIG. 3A shows a schematic diagram of a part of the intelligent conversion according to a preferred embodiment of the present invention.

Please refer to FIGS. 1, 2, and 3A. The user User speaks an input voice message Voice_in "Puppy, wake up!" to the mobile device 10. The Puppy according to the present embodiment is the personal name of the voice module 12. The voice module 12 of the mobile device 10 then perform recognition on the voice message input by the user User, and thus converting the personal name to the intelligent conversation name according to the recognition data of the voice message. The intelligent conversation name according to the present embodiment is Siri. Thereby, the voice message msg1 transmitted by the mobile device 10 to the Internet 30 includes the intelligent conversation name Siri. As a consequence, the server 20 trigger the intelligent conversation module 222 via the voice message msg1 containing the intelligent conversation name Siri.

Figure 3B:
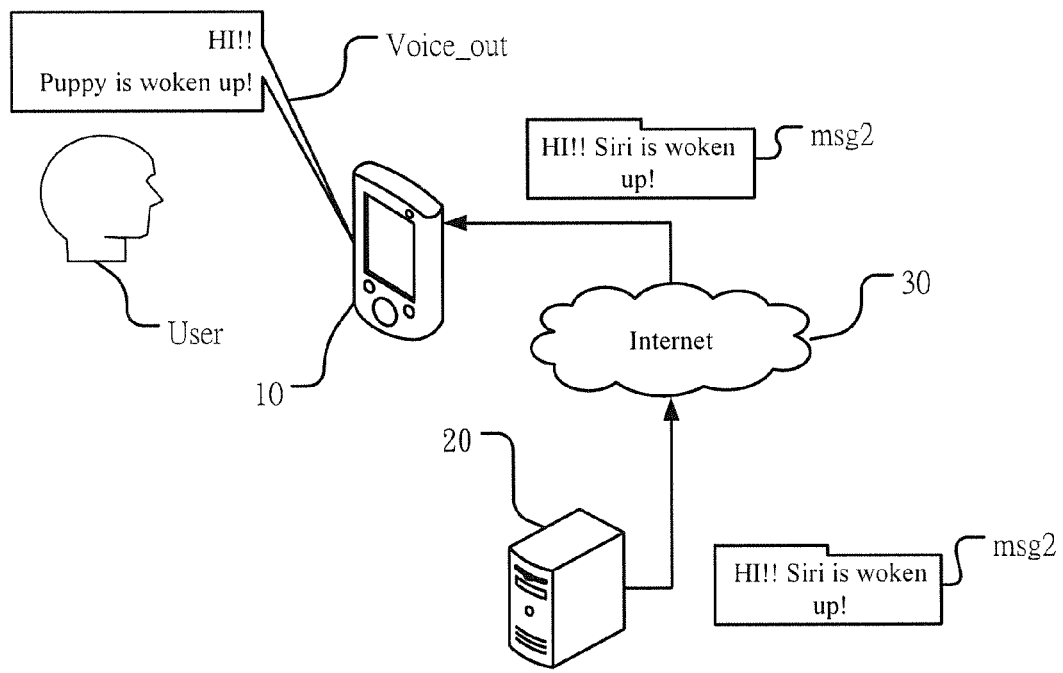
FIG. 3B shows a schematic diagram of a part of the intelligent conversion according to a preferred embodiment of the present invention.

Please refer to FIGS. 1, 2, and 3B. The intelligent conversation module 222 of the server 20 will reply a reply message msg2 according to the voice message msg1 input by the mobile device 10, where the reply message msg2 includes the intelligent conversation name Siri. The server 20 transmits the reply message msg2 to the mobile device 10 via the Internet 30. The mobile device 10 then converts the message including the intelligent conversation name Siri to a message including the personal name, and thus the mobile device 10 can transmit the voice message via the loudspeaker. That is to say, the voice message Voice_out "HI!! Puppy is woken up!" is output. Besides, the mobile device 10 can also display the reply message msg2 including the personal name on the display unit.

Accordingly, with the support of the voice module 12, instead of a single intelligent conversation name, the voice assistant of the mobile device 10 has a personalized name. The user does not need to worry about calling the voice assistants in other mobile devices mistakenly.

Figure 4:
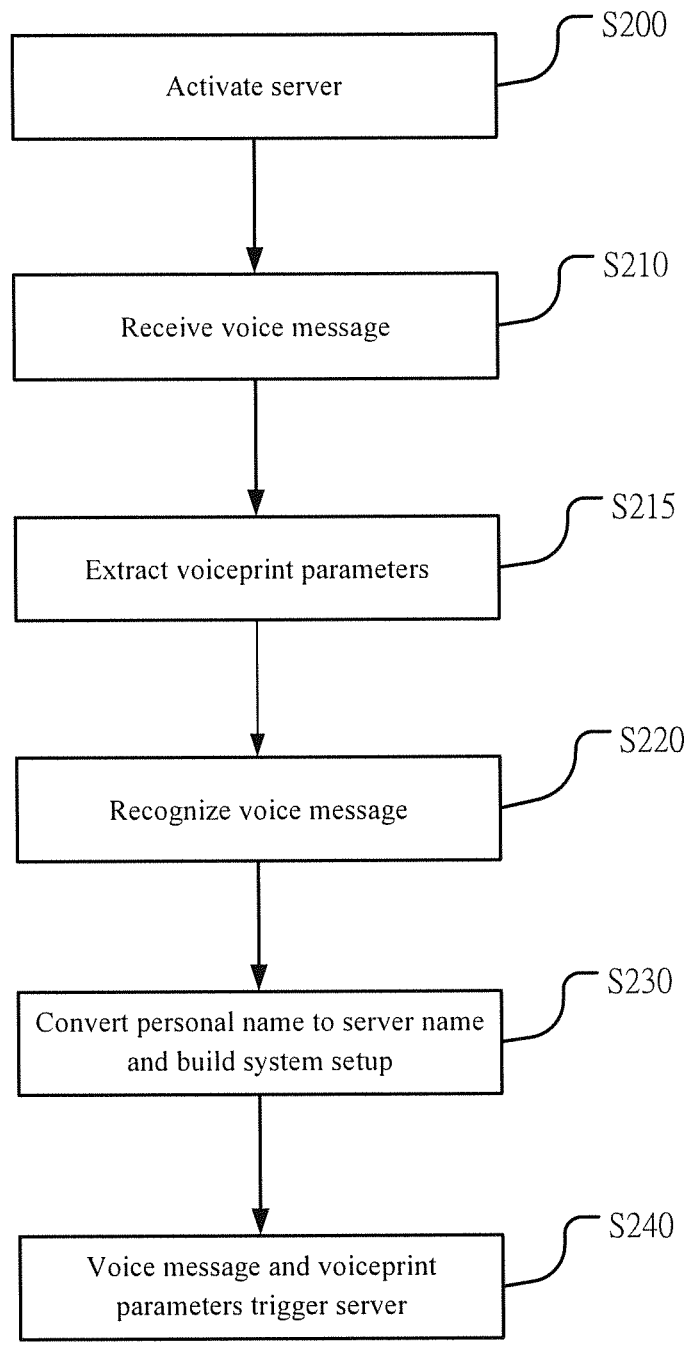
FIG. 4 shows a flowchart according to another preferred embodiment of the present invention.

Please refer to FIG. 4, which shows a flowchart according to another preferred embodiment of the present invention. The difference between FIG. 2 and FIG. 4 is that FIG. 4 further comprises steps of extracting voiceprint parameters and building system setup. As shown in the figure, the method for personalizing voice assistant according to the present invention comprises steps of:

- Step S200: Activating a voice module having a personal name;
- Step S210: Inputting a voice message to the voice module, said voice message including said personal name;
- Step S215: Extracting voiceprint parameters;
- Step S220: Recognizing the voice message;
- Step S230: Converting the personal name to an intelligent conversion name and building system setup; and
- Step S240: Triggering an intelligent conversion module of the server.

The steps S200 and S210 are identical to the steps S100 and S110. Hence, the details will not be described again here. In the step S215, the voice input unit 122 further extract the voiceprint parameters contained in the voice message for subsequent steps. In the step S220, the voice recognition unit 124 recognizes the voice message according to the voice reference data and the voiceprint parameters for producing the recognition data. Moreover, the voice recognition unit 124 can further performs recognition on the voice message according to the audio frequency. In the step S230, the message conversion unit 126 converts the personal name to the intelligent conversation name at a remote site. Meanwhile, build the system setup, for example, a system password, a webpage search setup, a user interface setup, or an encryption setup, according to the voiceprint parameters for improving personal security of the voice assistant. In the step S240, the voice transmission unit 128 transmits the voice message processed by the message conversion unit 126 to the server 20, so that the voice message including the intelligent conversation name can trigger the intelligent conversation module 222 of the server 20. In addition, the server 20 can further trigger the intelligent conversation module 222 according to the voiceprint parameters and the voice message.

Figure 5:
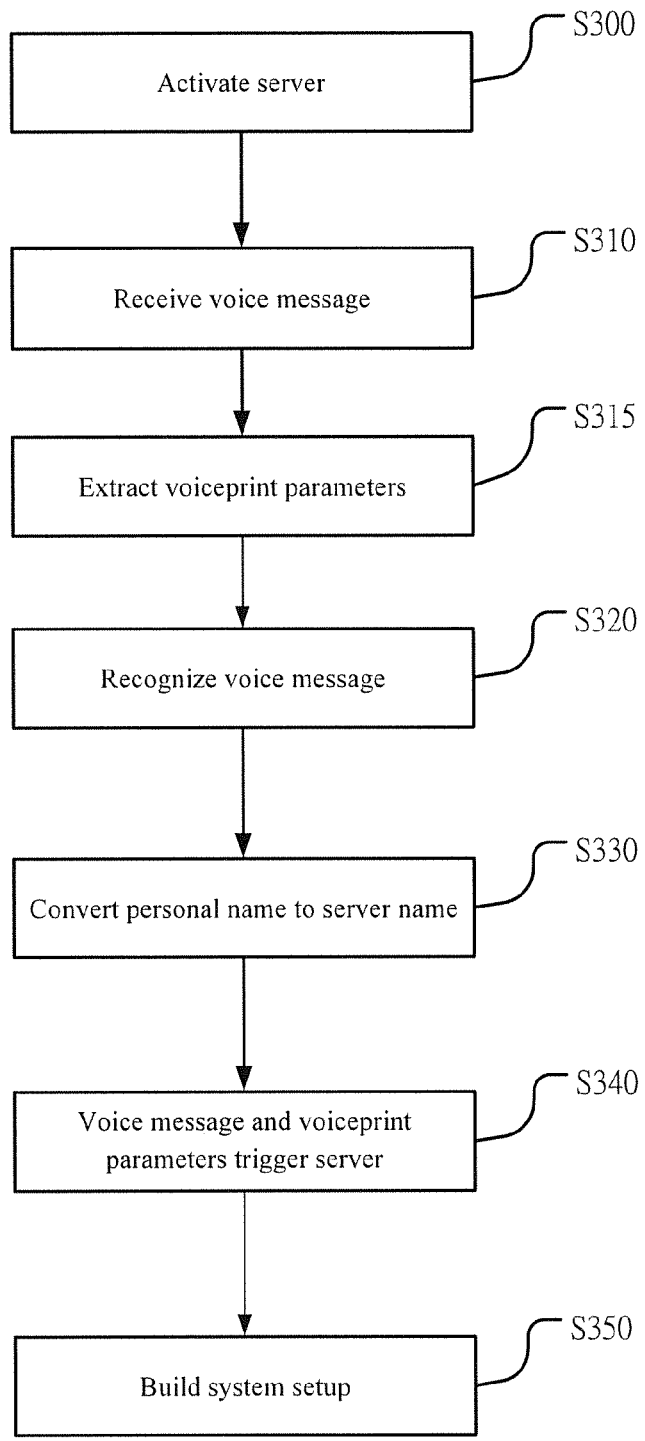
FIG. 5 shows a flowchart according to another preferred embodiment of the present invention.

Please refer to FIG. 5, which shows a flowchart according to another preferred embodiment of the present invention. The difference between FIG. 4 and FIG. 5 is that in FIG. 4, converting the personal name and building system setup are performed concurrently; in FIG. 5, building system setup is performed after trigger the intelligent conversation module. As shown in the figure, the method for personalizing voice assistant according to the present invention build system setup after triggering the intelligent conversation module. The method according to the present invention comprises steps of:

- Step S300: Activating a voice module having a personal name;
- Step S310: Inputting a voice message to the voice module, said voice message including said personal name;
- Step S315: Extracting voiceprint parameters;
- Step S320: Recognizing the voice message;
- Step S330: Converting the personal name to an intelligent conversion name;
- Step S340: Triggering an intelligent conversion module of the server; and
- Step S350: Building system setup.

The steps S300 to S320 and the step S340 are identical to the steps S200 to S210 and the step S240. Hence, the details will not be described again here. In the step S330, the message conversion unit 126 converts the personal name to the intelligent conversation name at a remote site. Thereby, the personal name of the voice message corresponds to the intelligent conversation name. In the step S350, the voice module 12 builds system setup, for example, a system password, a webpage search setup, a user interface setup, or an encryption setup, according to the voiceprint parameters for improving personal security of the voice assistant.

To sum up, the present invention provides a method for personalizing voice assistant, which corresponds the personal name to the intelligent conversation name by conversion for corresponding the voice module having the personal name to the intelligent conversation module of the intelligent conversation name. Thereby, the names of the voice modules owned by different persons will not be duplicate, and thus avoiding activation of adjacent voice modules by the same voice message. In addition, by using voiceprint parameters, the security of the voice assistant in the mobile device can be reinforced.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for personalizing voice assistant, comprising steps of:
    activating a voice module having a personal name;
    inputting a voice message to said voice module, said voice message including said personal name;
    extracting voiceprint parameters after said step of inputting a voice message to said voice module;
    recognizing said voice message to recognize said voice message according to said voiceprint parameters for producing recognition data, said recognition data is configured to build system setup; and
    said voice module converting said personal name of said recognition data to an intelligent conversion name;
    wherein said intelligent conversion name triggering an intelligent conversion module of a server.

2. The method as claimed in claim 1, wherein said step of said voice module converting said personal name of said recognition data to an intelligent conversion name further includes building system setup according to said voiceprint parameters.

3. The method as claimed in claim 2, wherein said system setup includes a system password, a webpage search setup, a user interface setup, or an encryption setup.

4. The method as claimed in claim 1, further comprising a step of building system setup according to said voiceprint parameters after said step of said intelligent conversion name triggering an intelligent conversion module of said server.

5. The method as claimed in claim 4, wherein said system setup includes a system password, a webpage search setup, a user interface setup, or an encryption setup.

6. The method as claimed in claim 1, wherein said step of recognizing said voice message further includes recognizing said voice message according to voice reference data containing at least a keyword.

7. The method as claimed in claim 6, wherein said step of recognizing said voice message further includes recognizing said voice message according to at least an audio frequency and said voice reference data.

8. The method as claimed in claim 1, wherein said step of said intelligent conversion name triggering an intelligent conversion module of said server further includes triggering said server to activate said intelligent conversation module according to voiceprint parameters of said voice message.

* * * * *